United States Patent [19]
Reyes

[11] Patent Number: 5,818,030
[45] Date of Patent: Oct. 6, 1998

[54] CREDIT CARD SYSTEM WITH KEY MODULE

[76] Inventor: Rene A. Reyes, 4016 Hessmer St. Apt 7, Metairie, La. 70002

[21] Appl. No.: 787,646

[22] Filed: Jan. 23, 1997

Related U.S. Application Data

[63] Continuation-in-part of Ser. No. 399,762, Mar. 7, 1995, abandoned.

[51] Int. Cl.⁶ ...................................................... G06K 19/06
[52] U.S. Cl. ........................... 235/492; 235/487; 235/493
[58] Field of Search ..................................... 235/492, 487, 235/493

[56] References Cited

U.S. PATENT DOCUMENTS

5,677,524   10/1997   Haghiri-Tehrani ....................... 235/492

*Primary Examiner*—Harold Pitts
*Attorney, Agent, or Firm*—Joseph T. Regard, Ltd.

[57] ABSTRACT

A secure, smart credit card system having the same basic dimensions of a standard credit card. The preferred embodiment of the present invention includes a main body having situated thereon a main central processing unit (CPU). A portion of the main body has formed therein a space or slot for accepting a key unit, which is configured to engage the main body in the formed space or slot, the joined pieces maintaining the same basic dimensions of a standard credit card. The key unit may include an intelligent micro-memory module and power supply, and, upon physical engagement to the main body, may be programmed to initiate a "key" protocol to open or lock access to the functions of the main body, communicating with the main CPU upon physical insertion into the main body, thereby initiating or preventing functioning of electronically programed features of the main CPU. The key unit may further include a ROM memory for encoding data and/or a security code in memory, which code may be communicated to the main CPU, upon sliding insertion of the display into the display slot formed in the main body. Additionally, an LCD on the key unit may display the only indication of the credit card number of the card, so that without said LCD display "key" and ROM data and security codes properly inserted into the main body, the body of the card (and the key unit) each individually is merely a blank with no value to a thief.

11 Claims, 6 Drawing Sheets

CREDIT CARD SYSTEM WITH KEY MODULE

The present invention is a continuation-in-part of U.S. patent application Ser. No. 08/399,762, filed Mar. 7, 1995, entitled "Credit Card System with Display Key Module", listing as inventor Rene A. Reyes now abandoned.

TECHNICAL FIELD OF THE INVENTION

This invention relates to secure data cards carried upon a person, and more particularly to a secure, two piece, smart credit card system, wherein there is provided a main body a main body having situated thereon a main central processing unit (CPU). A portion of the main body has formed therein a space or slot for accepting a key unit, which is configured to engage the main body in the formed space or slot, the joined pieces maintaining the same basic dimensions of a standard credit card.

The key unit may include an intelligent micro-memory module and power supply, and, upon physical engagement to the main body, may be programmed to initiate a "key" protocol to open or lock access to the functions of the main body, communicating with the main CPU upon physical insertion into the main body, thereby initiating or preventing functioning of electronically programed features of the main CPU.

The key unit may further include a ROM memory for encoding data and/or a security code in memory, which code may be communicated to the main CPU, upon sliding insertion of the display into the display slot formed in the main body. Additionally, an LCD on the key unit may display the only indication of the credit card number of the card, so that without said LCD display "key" and ROM data and security codes properly inserted into the main body, the body of the card (and the key unit) each individually is merely a blank with no value to a thief. An alternative embodiment of the present invention may utilized a small keypad on the surface of the card for entering a password or code prior in order to prevent unauthorized usage of same.

BACKGROUND OF THE INVENTION

While the prior art is replete with various and diverse smart credit card systems, none are believed to teach the unique, smart key/display features of the present invention.

Even today, with the advent of tiny, long life lithium batteries, static memory, thin, lightweight, durable displays and efficient integrated circuitry, the prevalent credit card remains the same plastic, embossed card with raised letters introduced in the 1950's. Credit card theft and fraud accounts for billions of dollars in damages a year, and yet the solution to this security problem is able to be accomplished cheaply and effectively with today's technology.

The many attempts at providing a smart, secure credit card system in the past have proven too user unfriendly or unreliable, and this is believed why such cards have not gained user acceptance.

On the other hand, personal data cards have, over the last few years, increased in popularity, providing the user with a tiny databank for storing important alphanumeric data such as phone numbers, appointment schedules, and to-do lists, etc.

Unlike the prior art, the present invention provides an easily implemented security system which utilizes some of the features of the personal data card, but without the necessity of the user having to be computer literate, or knowing how to type, etc.

A listing of patents which are believed to have some pertinence to the present invention follow:

| Patent Number | Inventor | Date of Issue |
| --- | --- | --- |
| 5,326,964 | | |
| 5,317,636 | | 1994 |
| 5,276,311 | Hennige | 01/04/1994 |
| 5,255,941 | Solomon | 10/26/1993 |
| 4,947,027 | Kashkashian, Jr | 10/13/1987 |
| 4,707,594 | Roth | 11/17/1987 |
| 4,697,073 | Hara | 09/29/1987 |
| 4,587,413 | Hoppe et al | 05/06/1986 |
| 3,909,595 | Morello | 10/1975 |
| 3,902,262 | Colegrove et al | 09/02/1975 |
| 3,833,929 | Kirley | 09/03/1974 |
| 3,457,391 | Yamamoto | 7/1969 |

U.S. Pat. No. 5,255,941 issued 1993 teaches an "Anti-fraud Credit Card Assembly" teaching a card which includes a slidingly removable magnetic strip, to prevent unauthorized use of said card. Without the magnetic strip, the card is recognized as unusable.

Thus, like the present, searched for invention, this patent teaches the concept of a security key which, when removed, prevents the unauthorized use of the card. However, while there may be some general conceptual similarities, the present invention made subject this application differs in both method and apparatus for accomplishing the security key, providing a novel rom data/security means in conjunction with the only data display for the card system. '941, on the other hand, appears to teach merely the ability to remove the magnetic strip; there is no data interaction between the card body and the display key, and the card apparently has written indicia thereon identifying the account number and user, which leaves it open for fraud.

U.S. Pat. No. 5,326,964, apparently teaches a "Separable multi-account safety credit card system", wherein the account numbers and the card are "mechanically detachable into two component parts, whereby that part upon which is embossed the credit account numbers may be separately carried from the individual identification part . . . " to prevent unauthorized transactions. The patent does not appear to teach particularly the LCD display of the numbers, or the smart key/card body interaction, but appears to illustrate the concept of removing the numerical account indicia from the card to prevent fraud.

U.S. Pat. Nos. 5,317,636 and 5,276,311 teach smart credit cards having a QUERTY keypad or the like thereon for entry of passwords, and displays for indicating account information, signature information, or the like.

U.S. Pat. Nos. 4,697,073 teaches a credit card which appears to have separable the electronics, along with contact means for communicating with the verifying equipment.

U.S. Pat. Nos. 3,909,595 and 3,457,391 teach electromechanical defective credit card retention systems for banking and vending machines, wherein a "hot" card is withheld from the user, and is retained by the machine.

The remaining patents cited are included for general information and research purposes, teaching various credit card systems, but do not appear to be as pertinent as the above cited patents.

GENERAL SUMMARY DISCUSSION OF THE INVENTION

Unlike the prior art, the present invention contemplates a secure credit card system which is flexible in its various alternative uses, effective in promoting security, easy to use, and relatively inexpensive to produce and maintain.

The above patents may contemplate various alternative credit card systems, some programmable, some having removable indicia (magnetic or raised), but none contemplate the present smart, keyed system wherein the card body is useless without the key display unit, and visa-versa.

The preferred embodiment of the present invention teaches a card body having the same basic dimensions of a standard credit card, but further including therein microprocessor, memory, and power functions for preventing unauthorized use of said card. The main body CPU would be programmed to be associated with the user, such that only other key units assigned for use by the user would initiate the CPU. This system would therefore be of value, for example, for preventing credit card fraud. In such an example, the user would possess.

In the preferred embodiment of the present invention, a display may be provided in the key unit, which key unit is further configured so that it may slidingly engage with the main body, acting as a "key" to initiate or prevent functioning of the electronic features of the main body CPU. The display may preferably include ROM memory means (static or dynamic) for encoding data and/or a security code in memory, which code may be communicated to the CPU in the main body forming the card, upon engagement which could include, for example, sliding insertion of the display into an engagement slot formed in the card, which may be positioned such that a display on the key unit is visible from the top face of the card.

The LCD display, in the preferred embodiment of the present invention, may be programmed to provide the only visual indication of the credit card number of the card, and the display initiated only upon insertion with an appropriate main body CPU and programming interrogation to insure validity, so that without an appropriately paired LCD display key unit and ROM data and security codes, the body of the card is merely a blank with no value to one seeking unauthorized access thereto.

As will be set forth below, an alternative embodiment of the present invention is also contemplated which utilizes a small keypad on the surface of the card for entering a password or code prior in order to prevent unauthorized usage of same, as well as providing some limited programming and information storage capabilities, as well as, alternatively, a calculator, clock, calendar, etc.

Thus, the preferred embodiment of the invention provides a high performance credit card based on a (DDS) dual device system which is organized into the following major units: A micro programmable central processing unit (CPU) in the main body, and an engage able (IM-3) intelligent micro memory module, which functions as a key unit, configured to join the main body to form an engaged unit having the general dimensions and appearance of a "smart credit-type card". The CPU of the main body and instructions are designed to operate in conjunction with said external device (IM-3) intelligent micro memory module, key unit. In the preferred embodiment of the present invention, the key unit stores the programs and data required by the processor CPU in the main body, to allow the user to operate the credit card system.

In a micro programmed CPU, each machine instruction is generally executed by a micro program which acts as a real time interpreter for the instructions. This implementation of the control part of a processor is facilitated in the present invention by using one basic design approach which is micro programmed control (micro program memory).

The present invention separates the digital system into two parts, a data processing component and a control component. The data processing component provides a calculating component capable of performing certain, programmed operations on data. The purpose of the control component is to issue control signals or instructions to the data processing component. These control signals select the functions to be performed at specific times and route the data through the appropriate functional units in the processing component.

In other words, the data processing unit is logically reconfigured by the control unit to perform certain sets of micro instructions.

The sequence in which these micro instructions are performed is very important so the control unit is intimately involved in the sequence and timing of the data processing unit. Therefore the function of the control unit for instruction set processors is to fetch micro instructions from a control memory and interpret them to determine the control signals to be sent to the data processing unit.

Two central aspects of this process can be identified:
1. Instruction sequencing
2. instruction interpretation Instruction sequencing. This is the method by which instructions are selected for execution or equivalently the manner in which control of the processor is transferred from one instruction to another.

Instruction interpretation is the other method used for activating the control signal that causes the data processing unit to execute the instruction.

As a micro instruction is stored in a special addressable memory called a (CM) control memory. The sequence of micro instruction needed to execute a particular operation constitutes a micro program for that operation. The operation is performed by fetching the (MI) micro instructions one at a time from the (CM) control memory and using them to be compared with micro instructions from external device, detachable (IM-3) intelligent micro memory module.

Micro programming clearly makes control unit design more systematic by organizing control signals into, executable instructions or words (micro instruction) having a well defined format. These signals may be implemented by a kind of software, firmware (micro-rom).

Consequently, design changes can easily be made by altering the contents of the control memory (CM)

The control signal selection sequencing high level set up of secret micro instructions are stored in (Micro ROM) control memory. The control signals to be activated at any time are specified by a micro instruction which is fetched from (CM) control memory that will able to process effectively only the instruction formats, data type and arithmetic modes that are defined by the manufacturer of the system by permission of the credit card company. Dependence between components.

A high degree of dependence, or synergy exists among the two key unit and main body components during operations, that is, the main body, with its CPU, and external engaged intelligent micro memory module (IM-3) key unit. This means that the main body CPU, in order to execute certain programs, the key unit (IM-3) must be plugged in. The interface between these two devices will enable or disable the ability of the joined components to transmit processing data by a sequence of, for example, ready/acknowledgment signals.

The data and exterior connections provided in the key unit external device (IM-3) must be properly engaged with the main body, in order for the key unit computer functions to interface with the main body CPU.

We can view the present system, which may function well, for example, as a credit card fraud prevention system, as comprising two classes of object: A set of confidential information memory/processing components and an engaging interface that allows the transfer of information signals between components, and release of the confidential information, which may include credit card number, personal information number (PIN), and the like upon proper joining of the appropriately programmed key unit to the appropriately programmed main body. Release of the information, in the form of signal or terminal interface means, can be in the form of a display on the key unit or main body, electronic transmission via RF or optical signal via conventional RF transmitter of optical link, serial peripheral port, metallic stripe, or exterior bus connection.

Without an appropriately configured key unit and main body, each unit independent of one another is worthless to a thief.

This hierarchical design is achieved by three components:

1. The main body and key unit components should be dependent as possible;

2. The engaging interface between components should be simple;

3. Ideally, each component should be comprised of generally off-the-shelf, inexpensive and readily available elements, such as, for example: a printed circuit board (structured within the dimensions of a credit card), micro-memory modules (including the key unit external device), this is to facilitate the manufacture of the system, and its subsequent modification or maintenance.

Interface analysis between the main body (CPU) and key unit (IM-3)

Figure 3:
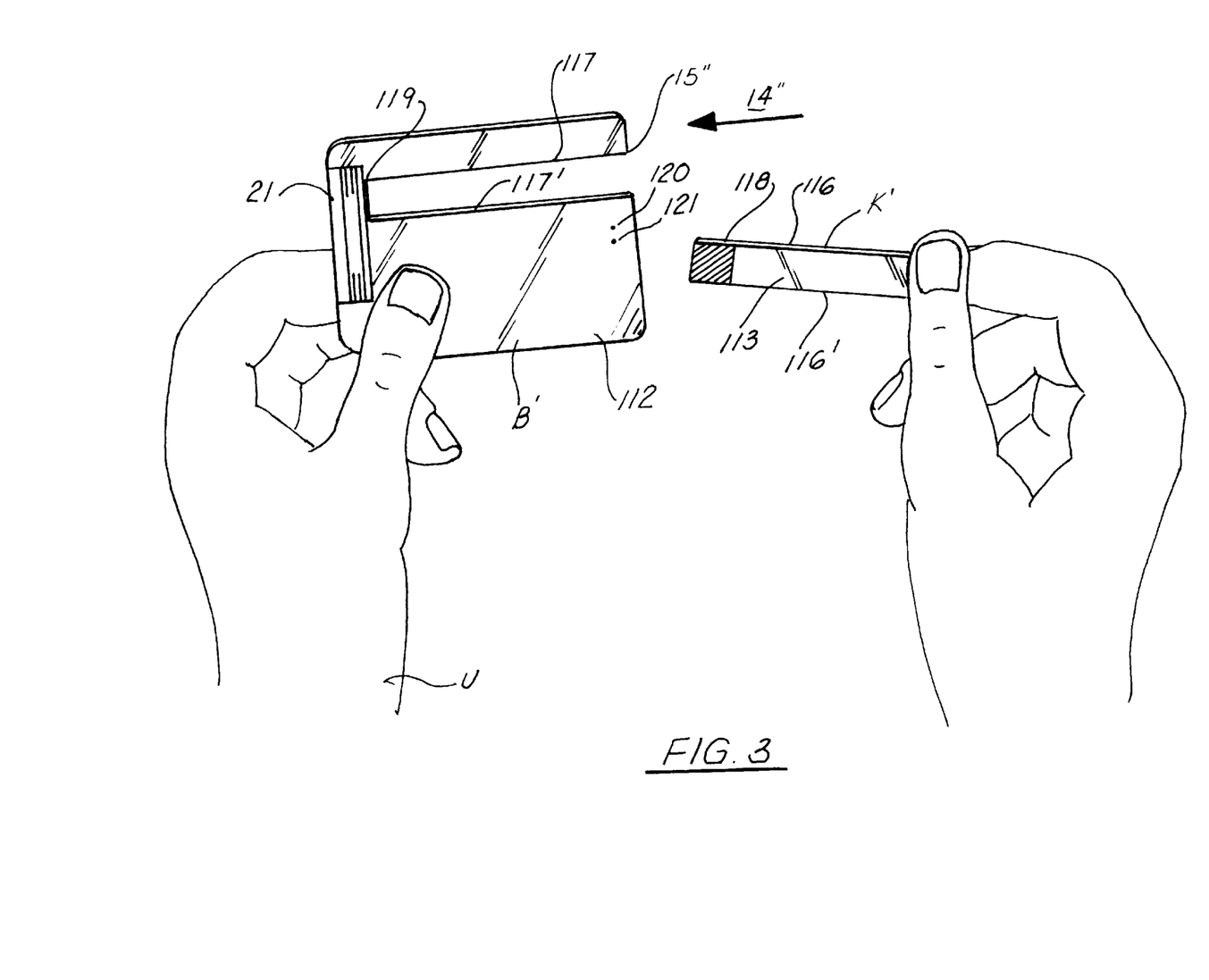

When a physical interface between the two devices is executed, as shown, for example, in FIG. 3, an interface analysis is indicated by the main chip (CPU) within the main body B' checking the interfaces between program elements (IM-3) in the key unit K' for consistency and proper data transfer.

Figure 1A:
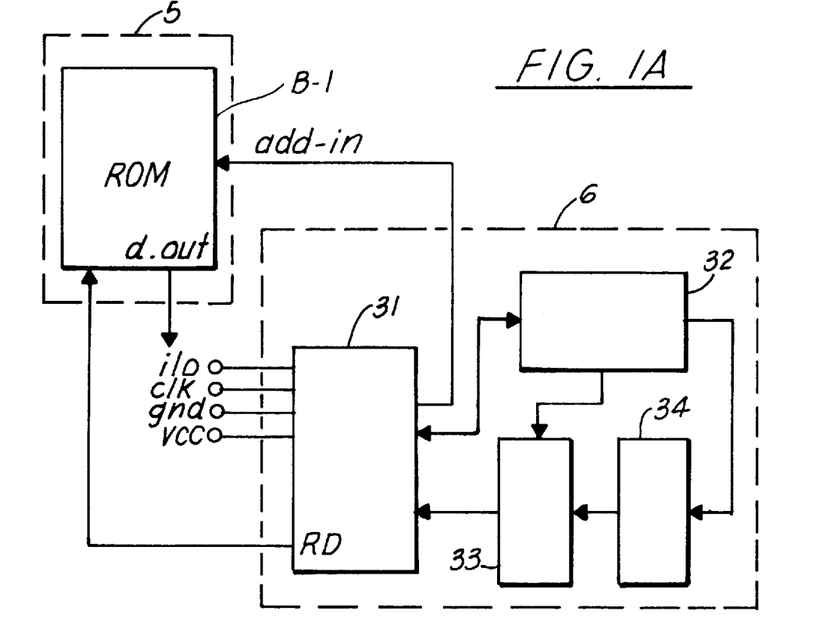
FIG. 1A is a block diagram of the smart card system of the present invention, showing an exemplary circuit structure of mainchip and subchip assembled in the structure

Interface Rejection Unit (IRU) (34) (FIG. 1A)

This device can be configured to be capable of adjusting, or rejecting, an interface signal processing such as: (LCOD) legal code and (ICOD) illegal code.

The main body unit is configured to work, ideally, with a plurality of various key unit components, each key unit may include ROM in the form of a (IM-3) micro memory module, and include secret identification data area A-60 (FIG. 5B) such as manufacturers data section and owners data section D-70.

It is therefore an object of the invention is to provide a high performance reliable smart credit card.

According to the invention, there is provided a credit card comprising of: at least one MCM having electrical terminal to be connected to an external device. A sheet like structure having one surface and supporting one of the IC chips;

Internal connecting members formed on both surface structures like bus slot said connecting patterns are connected to said electrical terminals of said IC chip.

It is thus an object of the present invention to provide a secure smartcard system which is inexpensive to manufacture, and easy to operate.

It is another object of the present invention to provide a secure smartcard system which effectively prevents unauthorized access to valuable credit card data.

It is another object of the present invention to provide a secure smartcard system comprising a battery having a CPU and power means, and an interlocking, peripheral secure key/display module, including display means, static or dynamic memory indicating credit indicia, programming information, and access codes to enable the system upon joining with and verifying access to the authorized main credit card body.

It is another object of the present invention to provide a method for preventing credit card theft, utilizing a two piece smart card system comprising a main body having no identifying or other indicia thereon, a smartcard display/key module having the critical user/credit/programming data stored therein, and means for mounting the key and body to display and communicate the pertinent credit information as needed.

It is another object of the present invention to provide a system for preventing credit card theft, wherein there is provided a smartcard databank system which is keyed via a removable display panel with memory means, the system providing everyday information such as telephone numbers and miscellaneous data upon request, and also critical credit card identification data for making purchases and the like.

It is another object of the present invention to provide a system for preventing credit card theft, wherein there is utilized a two piece smart card system without the necessity of having identification indicia printed thereon, the system initiated by the joining of the key display unit with the main body, wherein the display is initiated, indicating the pertinent, secure credit information, the main body further having thereon serial connection means for electronically or optically transmitting said credit data to an authorization terminal, without the need for manual input.

It is another object of the present invention to provide a system for preventing credit card theft, wherein there is utilized a two piece smart card system, the system having deactivation means upon failure to receive authorization for a purchase, wherein the authorization failure is communicated via the serial connection means to the key unit or main body display or other signal means, wherein a command is initiated into the program to jam the system, effectively preventing reutilization of the system.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 1B:
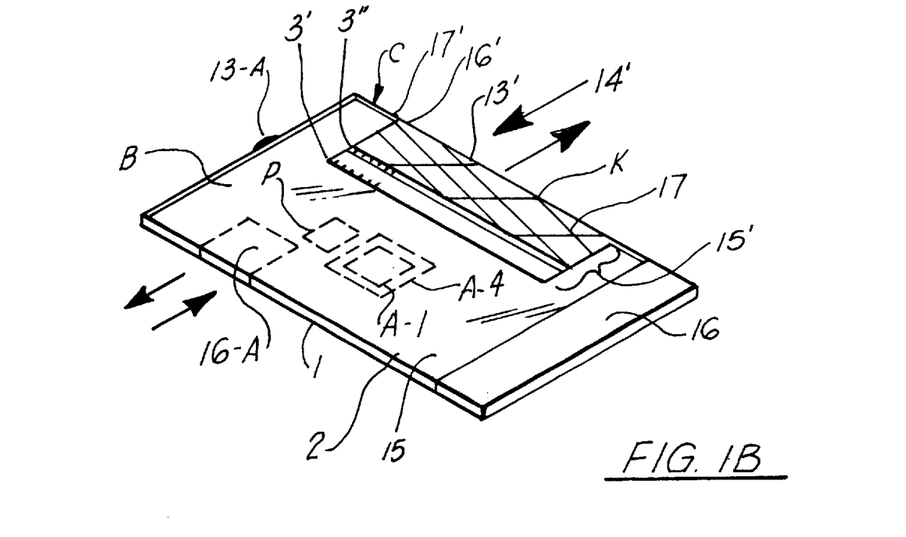
FIG. 1B is an isometric view of rear surface of the smart card system of the present invention.

FIG. 1B is an isometric view of the back side of the secure smartcard of the preferred embodiment of the present invention. The card C illustrated in the present figure is shown having a generally rectangular dimension, and is preferably comprised of flexible material. Preferably, it is about the same dimensions as a conventional credit card.

As shown, the card C includes a main body B, and a separate key unit K configured to engage said main body at a space formed therefore, in such a manner as the joined main body B and key unit K appear a singular, generally credit card configuration and size. The key unit may include a magnetic stripe 17 shown on its rear face, the front face of the key/display K module on the opposing side may be configured to have a display, such as, for example, and LCD display, which may be viewed, when inserted, from the front face of the main body B, which key/display module, in the preferred embodiment interfaces with the body B, for example via tongue and groove, sliding engagement, terminating in a conductor interface.

The body B has front 1 and back 2 surfaces, upon which there may be provided some limited indicia, such as, for example, the card issuer, and as desired, the owner or holder of the card, but it should preferably not include credit card number data or the like.

As shown, the key unit K is programmed to perform the function of a key, the preferred embodiment of the key having memory unit (which may be static or dynamic, in which case it further includes a power source), display unit (facing and exposed on the front 1 surface of the body when installed), and magnetic (or metallic) stripe in the back surface of the module.

An exemplary embodiment of the main body B of the present invention is a rectangular plate having flexibility and exemplary measurements of 54 mm width, 2 mm thickness and 85.1 mm length and a metallic stripe 16 of 7 mm width. It may be desired that the card has has no embossing of owners information such as name, exp. date, acct. number, with the back surface having owners information in the encoded magnetic strip, and a metallic strip to act as an interface to be connected to an external device. The back surface is substantially flat, the structure card accommodates substrate A-4 with CPU A-1 and a micro memory module accommodates subchips mounted thereon.

The main body has a space formed therein about the same size as the key unit, forming an inside edge, which space is configured to selectively receive said key unit in such a manner as to allow the communication of data to and from key unit memory and main body CPU, via interface contacts 3', 3", which are located along the inner edge of the space formed in the main body for the key unit, and the outer edge of the key unit, respectively, and are positioned so as to engage upon full engagement of the key unit to the main body.

As indicated, the key unit K and main body B are interfaced via contacts 3', 3", or the like, to allow communication between the main body CPU A-1 and key unit K subchip, which may include processor and/or memory modules located within the key unit K, which may be programmed with interrogation and authentication protocols upon insertion of the key unit into the main body, and engagement of the contacts 3', 3".

Figure 2:
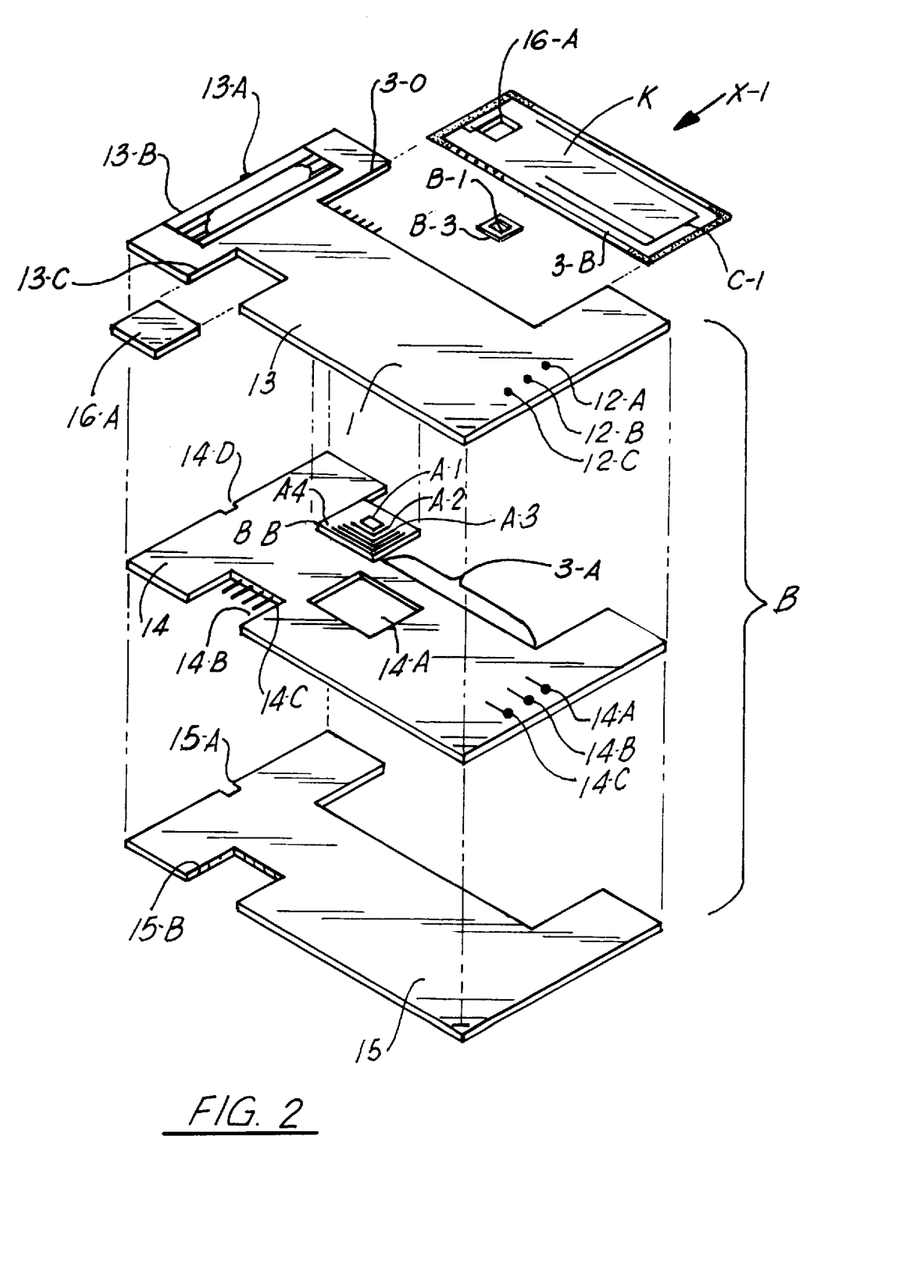
FIG. 2 is an perspective view of the main body and key unit components of the present invention, in a credit card assembly FIG. 3 illustrate the use of the present system, wherein the micro memory module is plug-in into the structure card, using different structure design FIG. 4 Illustrates a more detailed view of the serial interface of the invention of FIG. 2.

Referring to FIG. 2, main body CPU A-1 and key unit subchip B-1 may utilize large scale integration, (LSI) as desired, for providing maximum computing and storage power with minimal space requirements. The key unit subchip B-1 may include a substrate B-3 for mounting the chip, and providing conducting material to the interface. Likewise, main body CPU A-1 may include a substrate A-2 for mounting the chip, and providing conducting material to the interface, as well as power, as necessary, from, for example, a lithium battery power source P (FIG. 1B) in the body B. Further, this power source may be utilized to power the key subchip B-1 and other key functions, as desired.

Continuing with FIG. 2, main body B may be formed of three laminate sheets, with the front surface 1 having projected therethrough signal means in the form of, for example, three LED lights; red light 14-A indicates system locked, yellow light 14-B, which indicates low battery condition and green light 14-C which indicates system processing in progress, 14-A and 14-C indicate processor status. 12-A, 12-B, 12-C are holes to accommodate led lights.

Mainchip A-1 and sub chips, B-1 having respective internal CMOS/1st large scale integration, FIG. 2 showing 3A bus slot structure and 3B showing IM-3 uniform connection terminals these two devices connected via external interfaces upon the joining of the key unit to the main body, initiating the interface between the components.

Main chip A-1 may be fabricated by forming an integrated circuit on a single SI wafer, and the chip may be designed with, for example, 2.5 micrometers CMOS device design rules and having a die area of 5.5 mm$^2$ A-1 fabrication of sub chip B-1 and mounting thereof on substrate B-3 are the same as for main chip A-1 therefore their description is omitted. Substrate attach A-4 with main chip A-1 may be accommodated in an opening 14A of lower sheet 14 opening 14 A having substantially the same size of substrate attach A-4 lower sheet 14 has substantially the same thickness as case B. Switch 13 A may be provided to turn on the system as necessary providing power from lithium batteries or the like for, for example 15–20; seconds if no activity occurs the display will be turned off automatically after that period of time to save energy.

In the preferred embodiment of the present invention, upon insertion of the key unit into the main body and initiation of the system, data on the key display specifications (if any), system model, etc may be transmitted to the main body CPU, or may be otherwise transferred or shared between the main body CPU and key unit. If compatibility is found, the manufacturer's private code (MPRC) 22 may be utilized as the first priority key that opens the protocol between the two devices (main body CPU and Key Display subchip), upon insertion of the key display into the main body and initiation of the system, either by switch 13 A or automatic initiation upon insertion of the key display into the main body via programming.

The ROM associated with the key display substrate may, for example, be programmed with the MPRC and communicate same to the main body CPU, or, visa versa, depending upon how the system is set up. Preferably, it would be the key display which would hold in ROM the proprietary data, but an alternative embodiment could store the data in the ROM in the main body, although the key display would still have to contain an access or verification code to act as a "key".

The verification cycle may then be initiated and, if the MPRC is incorrect, an alarm routine is activated, an indication is made that (ICOD) illegal code has been detected, in the form of, for example, a red light which is located on the front face of the main body, indicating that the system has been locked.

Upon locking, no information will be processed until the microprocessor unit gets the right password (MPRC), which can come only from the insertion of the appropriate key display K module.

If, on the other hand, the verification cycle determines that MPRC is correct, access is allowed, the key display, for example, transmits the proprietary data to the main body CPU for processing, which may include transmission via terminal interface or display via key display of credit number, user identification, expiration code, etc.

The above cycle may vary significantly from that set forth above, as it comprises in large part a programming feature, and may be easily varied and alternatively configured.

If the key display has been removed from the body, the red light on the main body may be programmed will come on for a few seconds, indicating that there will not be any type of information, not even from the metallic stripe until the key display K module is slidingly engaged into the corresponding main body, upon which time a green light, for example, will come on indicating that the system is ready.

Switch 13A may be provided to turn on the system, as necessary, providing power from lithium batteries, or the like. A display may be configured to display data such as card holder account number (CRACC), name (CHN), expiration date (EXD), and the like.

The electric circuit main chip A-1 and sub-chip B-1 will now be described with reference to FIG. 1A ROM micro modules are provided to the use with different storage capacity the method use to write information into a memory may be irreversible in that once information has been written it can not be altered while the memory is in use read only, memories are therefore a nonerasable storage device.

Specifically main chip A1 include (CPU) central processing unit 31 memory 32 (IRU) interface rejection unit control memory, comparator 33, sub chip has ROM (read only memory) Vcc terminal GND terminal CLK clock and I/O are connected to main chip A-1.

Figure 5A:
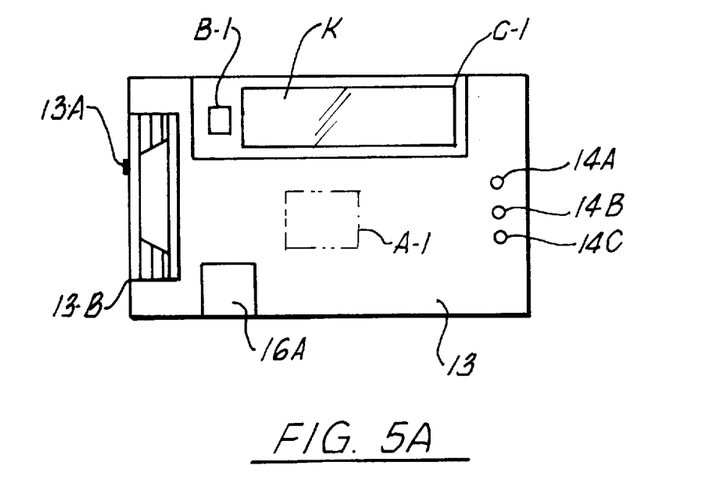
FIG. 5A is a schematic view showing memory areas
Figure 5B:
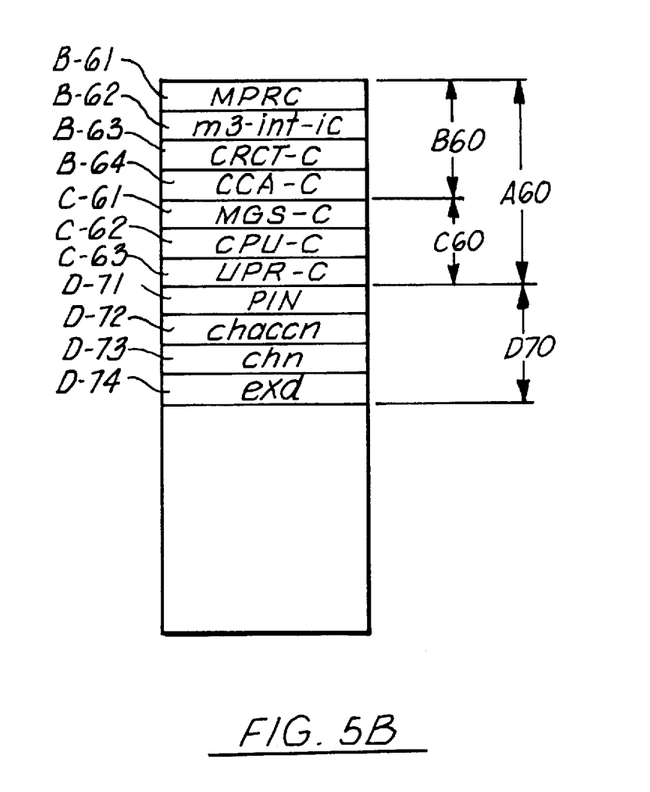
FIG. 5B is a front view of the preferred embodiment of the present invention, illustrating the key unit engaged to the main body, with the display of the key unit clearly visible.

ROM 41 preferably includes memory areas as shown in FIG. 5B more specifically key unit subchip Be, in the form of ROM, may have high level secret identification data, a secret area A-60 (FIG. 5B) in which owners and manufactured identification data is stored this data section then will be read out by the (CPU) central processing unit, then comported with data stored in micro ROM control memory for respective data processing or disability of the system.

Identification data section A-60 includes manufacturers data area in which secret data (codes) are written by the manufacturer of the ICD integrated circuit device. Manufacturers data area B-60 has CCA (Credit card authenticator) B64 and data section B-61 has (MSRC) manufacturers secret code. In memory area B-64 is stored an CCA code consisting of 64 bits, the CCA code is transmitted to a card terminal to be used for a computation of SAC (sales approval code) Data area B-60 has M-3 INT-IC (micro memory module interface identification code) memory section B-62. In memory area B-60 section B-63 a CRC-T (credit card type) code is stored, to identify the authenticity of different CRCM (credit card modules), or key unit(s).

Memory Area D70, Section D-71 has PIN (Private Identification Code), Section D-72 has CHACCN (Card holder Account Number), Memory Area D-70 Section D-73 has CHN (Hard Holder Name), and Section D-74 has EXD (Expiration Date).

In Data Area C060, Section C-63, has UPRC (User Private Code). This code is to verify the authenticity of the credit card owners. This process is described according to an input signal from a card terminal. The identification code should be memorized by the owner to be transmitted.

Memory area C-60 section C-62 has CPU-C (CPU Code). This code stored in said area is used by the manufacturers purpose only as MICD (Manufacturers Identification Code Device) to prevent counterfeit devices.

Memory area C-60 Section C-61 has MGS-C (Magnetic Stripe Code) in which an identification string is stored. A code written by the manufacturer to be identified by the CPU to check authenticity of said magnetic stripe.

Figure 4:
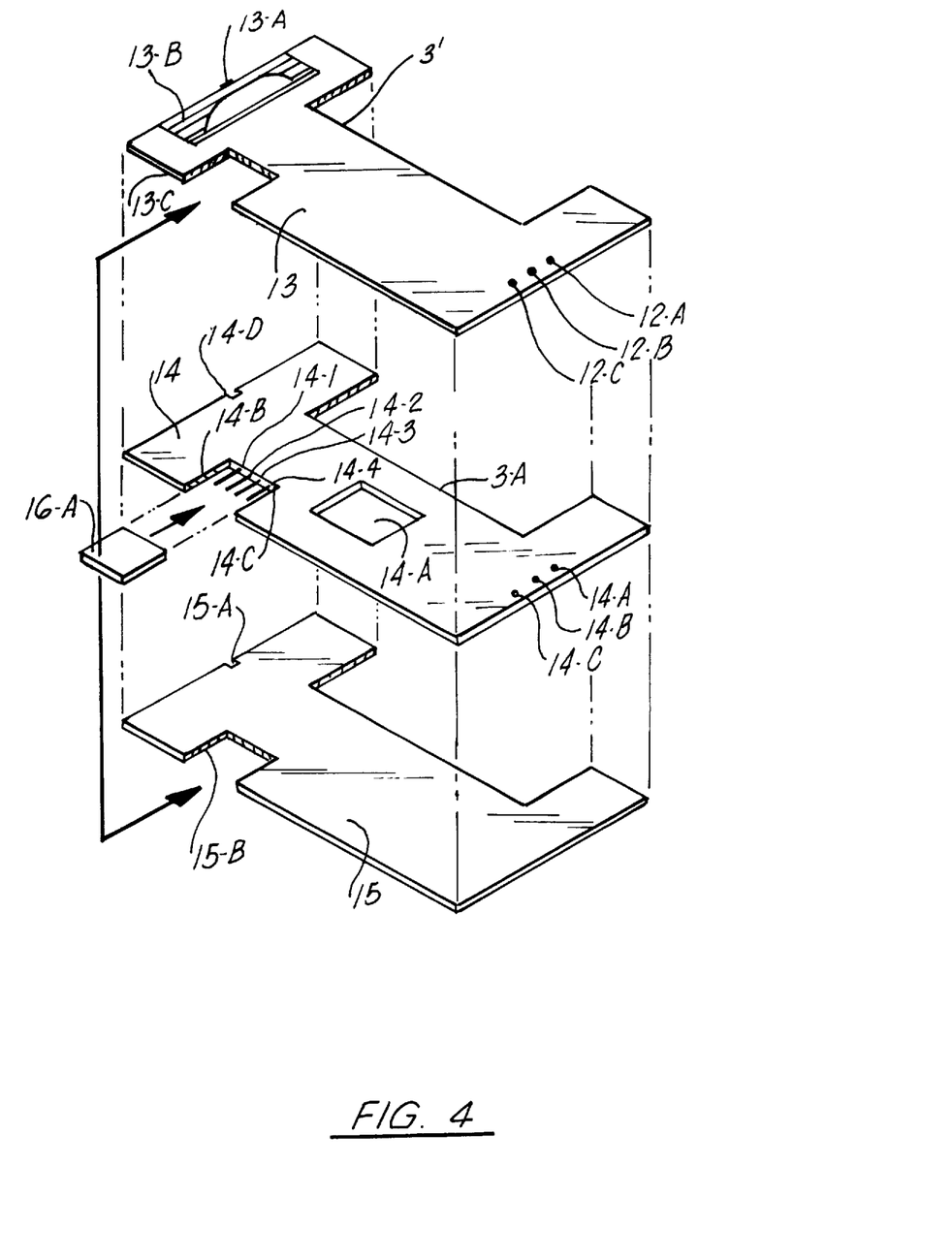

Referring now to FIGS. 4, 2, and 1B, there is shown sheet 14 having an opening formed 14-B, and a uniform contact terminal pattern, constituting a serial interface 14-C, which is protected by cover 16-A having holes to accommodate terminals 14-1, 14-2, 14-3, 14-4, which are projected from said front sheet 13, which run from the main body contacts 3', configured to interface with key unit contacts (3").

More specifically, referring to FIG. 2, sub-chip B-1 is mounted on substrate b-3 and then is set in opening 16-A of micro-sheet B-0. In this embodiment, the micro-memory module C-C is integrated by the following components, namely, sub-chip B-1, Display C-1, and magnetic stripe 17. Therefore, the system supports different types of memories and different data formats required from the credit card company.

Figure 6A:
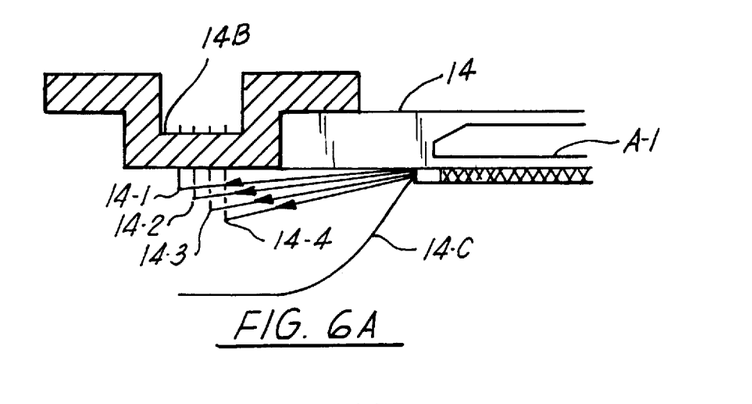
FIG. 6*a* is a schematic diagram for internal contact pattern for serial interface for the present invention.
Figure 6B:
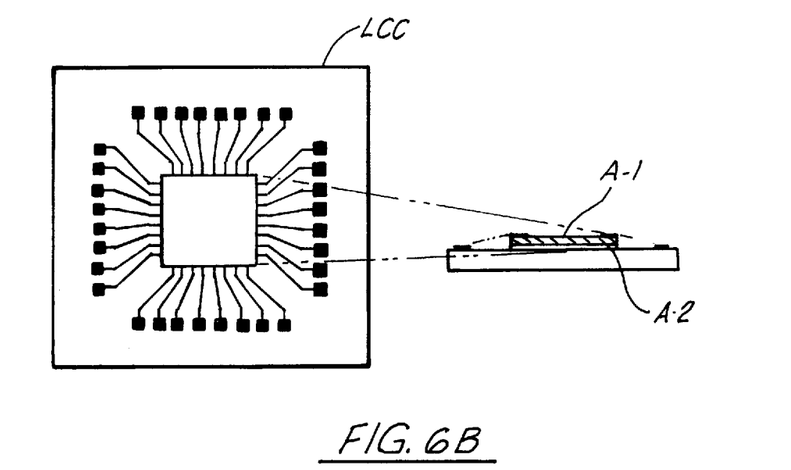
FIG. 6b illustrates an exemplary device attachment for the CPU component of the present invention.
Figure 6C:
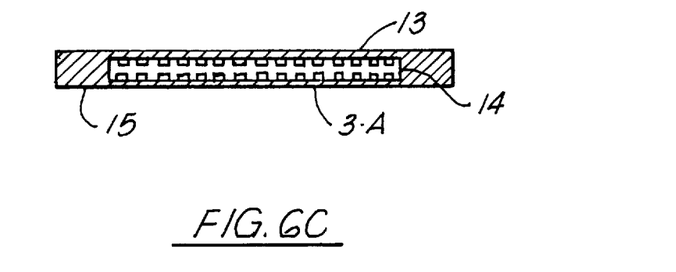
FIG. 6c is a diagram showing an exemplary small bus slot structure (SBS).

As shown in FIG. 6A, contact terminals 14-1 to 14-4 are connected to the contact window 14-B extended into through hole. These are connected to leads of main unit A-1-LCC through wiring pattern. A-1 constitutes the device side, and A-2 device is attached as shown in FIG. 14B. FIG. 6C represents the small bus slot 3A which is formed when upper sheet 13, lower sheet 14, and back sheet 15 are bonded together, as shown in FIG. 2.

A terminal interface feature of the main body CPU may be provided to allow for the outside peripheral access to the unit for transmitting the proprietary data upon verification/security confirmation, or may be utilized to program or update the main body or key display processor functions or programming.

The ID data in the verification string, from initiation to acceptance or denial may include, for example, as referenced in FIG. 5B:

MGSC=Magnetic stripe code
IPRC=Issuer private code
CRACCN=Card holder ACCN
CHN=Card holder name
EXD=Expiration date Continuing with FIG. 2, the key unit subchip B-1 may include ROM, providing ID Data (Identifying Data), which is fed to the main body CPU. Identification data may include, for example, a manufacturer's data section in which data is written by the manufacturer of the systems private code written by the manufacturer of the IC, a secret code that opens the access mode of the acknowledgement of the priority codes of maximum security (internal routine) executed by the main chip.

Further included in memory may be an ICA (IC Card authenticator) memory area, which may be transmitted to the main body, or to an exterior card terminal, to be used for computation of a sales approval code (SAC), for example; the memory can further include, as desired, a MPRC (manufacturer's private code).

Therefore, those priority codes may include, for example:

(MGSC) Magnetic Stripe Code in key display memory, in which an identification string is stored an MGSC code written by the manufacturer of the IC to be identified by the main body ICU.

ISSER (issuer) data section may include an IPRC memory area for initiation after the acknowledgement routine has been executed by the main body CPU. The same system will authorize CHACCN, Card Holder Account Number, CHN Card Holder Name, and expiration date. ID these data will be shown up on display. In the preferred embodiment, main body CPU and key unit provided as separate IC chips, thus, it is only necessary to alter only the key display subchip for different formats for the recording of data required from the credit company and main chip can be used commonly.

The main body, as earlier discussed includes a CPU A-1 for processing a signal, and preferably a storage device including a non-volatile memory having a memory area for storing a code number capable of storing data such that the stored data can not be altered.

In use, the user may have a personal main body which is carried with him/her regularly. The key unit could store proprietary credit card data for use in a transaction, with the main body functioning as an authenticator/display or transmittal unit, indicating the pertinent credit card information/ authorization to the vendor. The insertion of a key unit into a main body could be a permanent insertion, wherein once joined, the key unit and main body are fixed together for the life of the components, or, the key unit may be removeable and interchanged with multiple other key units representing credit card and other proprietary or authorization data, each key unit selectively utilized by the user by selecting the appropriate key unit for the transaction, inserting same into the main body, forming a credit card sized unit, initiating transmission of the proprietary data in the key unit to the main body unit, allowing the main body CPU to authenticate the validity of the information in the key unit, and allowing the main body CPU to transmit either an indication of authenticity, along with pertinent proprietary information for the transaction, or and indication of invalid or unauthorized use of a key unit not programmed to function with the user's main body unit, and, alternatively, and alarm or signal indicating same, and/or a locking of the system.

Referring to FIG. 1B, in use, the user grasps the main body B of the card with one hand, while grasping the key unit K with the other. Making sure the faces of the main body and key display are aligned, such as, for example, the front surface 1 of the main body B and front surface 13' of the key unit K face the user, the user then slidingly inserts 14' the key display into the key display engagement area 15', making sure the side edges 16' (which may be of a tongue configuration) of the key display are aligned with and slidingly engage the side edges 17' of the main body (which may be grooved). Also, the user must make sure the end of the key display having the contacts 3" is inserted first, to allow said contacts to interface with the key display contacts 3' of the main body.

Upon initiation, either via the switch or sliding insertion of the key display into the main body, as desired, visual indicia, such as the led's illustrated in FIG. 2 will come on, indicating access denied or access allowed, respectively, or, in the alternative, the display of the key display, which may be, for example, LCD, will display the access denied or allowed, or other transmission of indication means via RF, optical, or serial connection, as earlier indicated. If allowed, the vendor will be able to process the card, having access via terminal interface to the card, RF, or other transmission means (for automated processing), as well as visual access to the credit data via the display (for manual processing and verification).

An alternative embodiment of the present invention is illustrated in FIG. 3, wherein there is provided a longitudinal slot formed in the main body for the longitudinal engagement of the key unit, as opposed to the lateral engagement contemplated above. Although the engagement of this alternative embodiment is distinguishable from the above embodiment(s), the other components and functional aspects of the invention remain unchanged.

Continuing with FIG. 3, in use, the user U grasps the main body B' of the card with one hand, while grasping the key unit K' with the other. Making sure the faces of the main body and key display are aligned, such as, for example, the front surface 112 of the main body B' and front surface 113 of the key unit K' face the user, the user then slidingly inserts 14" the key display into the key display engagement area 15", making sure the side edges 116, 116' (which may be of a tongue configuration) of the key display are aligned with and slidingly engage the side edges 117, 117' of the main body (which may be grooved). Also, the user must make sure the end of the key display having the contacts 118 is inserted first, to allow said contacts to interface with the key display contacts 119 of the main body.

Upon initiation, either via the switch or sliding insertion of the key display into the main body, as desired, visual indicia, such as the red 120 or green 121 LED's shown, will come on, indicating access denied or access allowed, respectively, or, in the alternative, the display of the key display, which may be, for example, LCD, will display the access denied or allowed. If allowed, the vendor will be able to process the card, having access via terminal interface to the card (for automated processing), as well as visual access to the credit data via the display (for manual processing and verification).

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A security verification system for preventing the unauthorized utilization of proprietary data, comprising:

a two piece, selectively engage able smart card system configured to engage to form a structure having the same general dimensions as a credit card;

said first piece comprising a key unit component having memory, said memory having a security code and proprietary data stored therein, said key unit further comprising a key unit body having first and second edges, said key unit body enveloping said memory, said key unit body having a key unit contact interface situated generally adjacent to the exterior of said key unit body for transmitting data from said memory to an exterior device;

a main body having generally about the same dimensions as a standard credit card, said main body having a key unit engagement area formed therein for selectively receiving and engaging said key unit body in such a manner as to maintain the general dimensions of a credit card, said engagement means further having a main body contact interface configured to engage and contact said key unit contact interface upon full engagement of said key unit with key unit engagement area formed in said main body, said main body further including verification means for accepting, via said main body contact interface, said security code from said key unit memory, said verification means further including a CPU programmed to discern the authenticity of said security code upon full engagement of said key unit to said main body, and transmittal of said security code from said key unit memory to said main body CPU via said key unit contact interface;

display means for displaying data upon verification of the authenticity of said security code by said verification means.

2. The credit card system of claim 1, wherein said key unit and main body engage via tongue and groove, sliding engagement.

3. The credit card system of claim 1, wherein said key unit further houses said display means, and said display means comprises an LCD display.

4. The credit card system of claim 1, wherein said key unit has first and second surfaces, said first surface comprising said display means, said second surface comprising a magnetic strip having data encoded therein.

5. The credit card system of claim 1, wherein said key unit has first and second surfaces, said first surface comprising said display means, said second surface comprising a metallic strip.

6. The credit card system of claim 4, wherein said display means further includes LED means on said main body, said LED means indicating the verification status of said security code by said verification means.

7. The credit card system of claim 5, wherein said display means further includes LED means on said main body, said LED means indicating the verification status of said security code by said verification means.

8. The credit card system of claim 1, wherein said main body further comprises terminal interface means for communicating data to an outside peripheral upon verification.

9. The method providing a security verification system for preventing the unauthorized utilization of proprietary data, comprising the steps of:

a. Providing a two piece, selectively engage able smart card system configured to engage to form a structure having the same general dimensions as a credit card;

b. Providing said first piece comprising a key unit component having memory, said memory having a security code and proprietary data stored therein, said key unit further comprising a key unit body having first and second edges, said key unit body enveloping said memory, said key unit body having a key unit contact interface situated generally adjacent to the exterior of said key unit body for transmitting data from said memory to an exterior device;

c. Providing a main body having generally about the same dimensions as a standard credit card, said main body having a key unit engagement area formed therein for selectively receiving and engaging said key unit-body in such a manner as to maintain the general dimensions of a credit card, said engagement means further having a main body contact interface configured to engage and contact said key unit contact interface upon full engagement of said key unit with key unit engagement area formed in said main body, said main body further including verification means for accepting, via said main body contact interface, said security code from said key unit memory, said verification means further including a CPU programmed to discern the authenticity of said security code upon full engagement of said key unit to said main body, and transmittal of said security code from said key unit memory to said main body CPU via said key unit contact interface;

d. Providing display means for displaying data upon verification of the authenticity of said security code by said verification means;

e. engaging said key unit to said main body;

f. transmitting said security code from said key unit to said main body;

g. verifying the authenticity of said security code;

h. if the authenticity of said security code is positive, displaying said proprietary data from said key unit on said display means;

I. if the authenticity of said security code is negative, locking the system.

10. The method of claim 9, wherein in step "c" said main body further comprises a terminal interface, and wherein in step "e" there is included the step of engaging said terminal interface to an exterior peripheral, and there is further included in step "h" of transmitting said proprietary data to said exterior peripheral via said terminal interface.

11. The credit card system of claim 10, wherein in step "c" said main body further comprises terminal interface means for communicating data to an outside peripheral upon verification, and there is further included in step "h" of transmitting said proprietary data to said exterior peripheral via said terminal interface.

* * * * *